INVENTOR.
JOHN L. WELCH

United States Patent Office 2,941,889
Patented June 21, 1960

2,941,889
PROCESS FOR PREPARING VEGETABLES

John L. Welch, Le Sueur, Minn., assignor to Green Giant Company, Le Sueur, Minn., a corporation of Minnesota Filed Jan. 16, 1956, Ser. No. 559,416

10 Claims. (Cl. 99—186)

This invention relates to the preparation of canned and frozen vegetables for human consumption. More particularly, this invention relates to the preparation of cream style vegetables and especially cream style corn.

While the invention is especially advantageous for the preparation of cream style corn and will be described with particular reference to canned cream style corn, it offers advantages as well for the preparation of other vegetables, as will be explained in greater detail hereinafter, such as peas, mushrooms, etc. While the expression "canned" will be used extensively throughout this description it is to be understood that preservation in other sealed containers, such as glass jars, is contemplated as well as the use of metal cans.

The specific improvements of the present invention include an initial rapid heating of the vegetables by direct steam under pressure. In the case of cream-style vegetables such as corn and mushrooms the specific improvements result in improved color and enhanced flavor due to shorter periods of heating and freedom from coagulation of the cream portion. In the case of other vegetables such as peas the method of the present invention results in improvement of color and flavor of the finished product.

In the conventional method of preparing cream style corn, ears of sweet corn are husked, trimmed and washed and are thereafter processed in a machine generally known as a "cream style cutter." This machine cuts off the tops of the corn kernels and thereafter scrapes the interior from the kernel bases remaining on the cob. The kernel tops thus obtained provide the solid components of the food product and are generally known as "caps." The substance scraped from the interior of the kernel bases is generally known as "scrapings" and is processed to form the cream portion of the product. Cream style mix may also be prepared by using whole kernels or sections thereof as the solid portion and ground kernels as the cream constituent.

The mixture of caps and scrapings produced by the action of the cream style cutter is cleaned by screening out cob fragments, corn silk and pieces of husk in especially designed equipment and is generally thereafter blended in batch mixers with a solution of salt and sugar and a suspension of starch. In large scale production the contents of several such batch mixers are generally combined in a larger tank to secure an output of uniform quality. The consistency of the proudct is usually standardized in a suitable consistometer by adding the proper amount of water. The resultant product is then filled into cans or other suitable containers and hermetically sealed. The corn is sterilized in the can after sealing.

Proper sterilization of cream style corn according to conventional processing methods requires relatively long cooking periods which produces changes in the corn product that harmfully affect its appearance and palatability. Extended application of high temperatures produces caramelization especially in the regions adjacent to the container walls, which darkens the natural color of fresh corn and destroys some of the delicate flavors, appreciably impairing the marketability of the final product.

It has previously been found that the cooking period ordinarily required to properly sterilize cream style corn may be materially shortened if the product is agitated during sterilization. Such agitation produces a more rapid heat penetration so that it increases the rate of heat transfer by the production of forced heat convection currents as compared to the mere conduction type of heat transfer obtained when the product is sterilized in stationary condition. Thus, by the simple expedient of rolling the cans or by conducting the canned product in a continuous flow through a tubular pressure vessel, the sterilization time may be reduced to one-half or less of the time ordinarily required. Such a reduction in time required for sterilization in the case of cream style corn does not produce a conspicuous improvement in the color and flavor of the final corn product and sterilization of cream style corn under agitation almost invariably causes coagulation of the cream portion of the corn.

It has previously been proposed to overcome the curdling difficulty by blanching the kernel caps before canning or the use of thick boiling or high hot paste viscosity starch. Neither of these expedients has found wide commercial acceptance.

A somewhat newer processing method is the aseptic canning technique by which the food product to be canned is sterilized in bulk for relatively short periods of time prior to filling and then is filled into sterilized cans and sealed under aseptic conditions. Cream style corn prepared by the conventional methods for sterilization by this technique is subject to coagulation.

It is the principal object of this invention to provide an improved process of preparing cream style corn utilizing sterlization under agitation without coagulation of the cream portion by controlling the manufacturing pressure and temperature conditions.

A further object of this invention is to provide an improved process of preparing vegetables including shorter high temperature treatment in order to improve the color and flavor characteristics of the products.

A still further object of this invention is to provide an improved process for preparing cream style corn for aseptic canning or freezing.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which.

Figure 1:
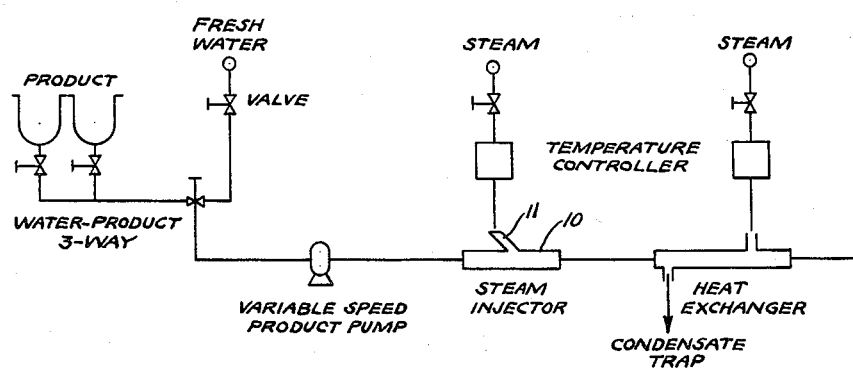
Figure 1 is a schematic and diagrammatic representation of the apparatus or system used for preparing cream style corn according to the process of this invention.
Figure 1:
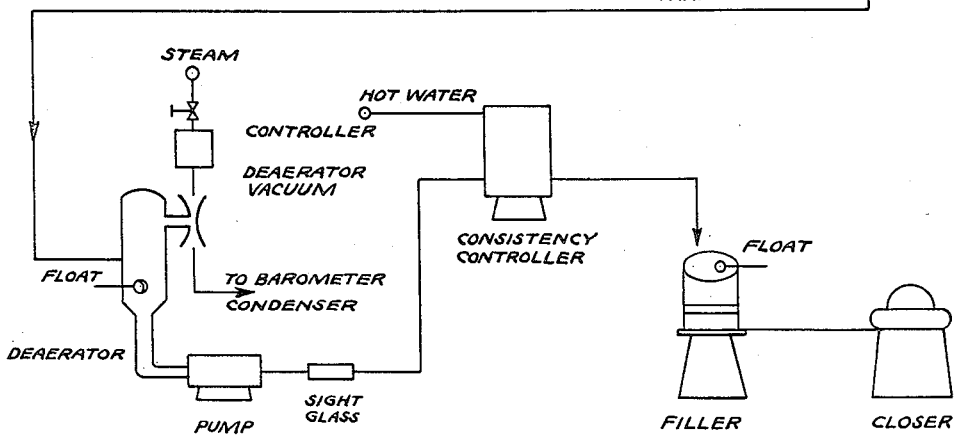

Broadly stated, the improved process of producing cream style corn according to this invention includes the steps of preparing sweet corn and processing it in a cream style cutter in any conventional manner, mixing and blending the product with flavoring and starch at room temperature, heating instantaneously by direct steam injection under pressure, equalizing the product temperature in a heat exchanger and deaerating the product to free entrapped air and gases and reduce the temperature of the product. For ordinary canning the process also includes the steps of cooling further and bringing to proper consistency as required, filling into cans, hermetically sealing and sterilizing under agitation. For aseptic canning the vegetable product is sterilized by holding in the heat exchanger for a longer period, cooled to filling temperature by pressure reduction, filled and sealed under aseptic conditons. For freezing the vegetable product is precooked and may be sterilized in the heat exchanger and then is frozen after deaeration. The essential steps of the process and required apparatus are shown diagrammatically in Figure 1.

The conventional system of processing cream style corn employs a series of mixing and blending tanks which are operated at varying levels of hot product. The product from the cream style cutter is mixed with seasoning and starch and heated to an elevated temperature of about 180° F., using direct steam introduced into the mixture by manifold perforated pipes. The raising and lowering of the level of the hot product in the tanks due to blending of several batches and adjustments of consistency at this temperature, causes adherence of the product to the sides of the tank. The temperature is favorable to the growth of bacteria which can cause flat sour and other spoilage. The normal manufacturing time from first heating to sterilization may be as long as 35 to 40 minutes.

To avoid these disadvantages of the conventional processing system, according to the improved process of this invention the corn product from the cream style cutter is mixed with agitation with seasoning and starch in any suitable vessel and blended at normal summer room temperature. Tap water sufficient for preparation of a creamed product is normally used in preparing this initial product mixture so that the material in the blending tank will have a somewhat lower temperature than the atmospheric temperature, that is, the product is blended at about 60°–80° F. This lower temperature materially reduces the tendency of the product to adhere to the walls of the mixing and blending tanks and permits ready cleaning of the tank walls. At the same time, thermophilic bacterial growth is not encouraged at the lower temperature.

The mixture of corn caps and scrapings, seasoning and starch is pumped from the mixing or blending tank continuously through a steam injector where it is contacted by steam under superatmospheric pressure (about 50 to 90 p.s.i.) and virtually instantaneously brought to the desired temperature of from about 185° to 250° F. for canning by ordinary methods. Preferably the product is brought to a temperature between about 220° to 245° F. Higher temperatures are used to prepare corn for aseptic cannings. Low temperatures are to be avoided because the starch will not completely gelatinize. Too high temperatures may induce curdling.

Figure 2:
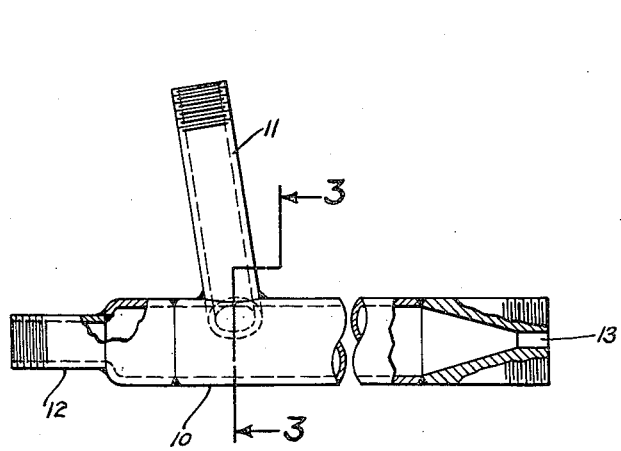
Figure 2 is an elevational view, partly in section, of the steam injection heater used in the process of this invention.
Figure 3:
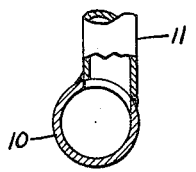
Figure 3 is a vertical section taken on the line 3—3 of Figure 2 and in the direction of the arrows.

As shown in Figures 2 and 3 of the drawing the steam is introduced into the injector tube 10 tangentially and in the general direction of product flow through an inlet pipe 11 intersecting the wall of tube 10 and positioned at an acute angle from the perpendicular (8° in this instance, but not critical). The injector tube 10 has a somewhat greater diameter than product inlet tube 12 and a restricted exit orifice 13. The corn mixture and steam are intimately admixed due to the turbulent flow conditions existing in the injector chamber. The tangential position of the steam inlet causes the mixture to swirl as the product is pumped through the injector tube and serves to scour the interior surface of the tube, preventing product bake-on. The angle of the steam inlet with respect to the line of flow assists the moving of the product through the injector.

The steam and corn product are introduced in such proportions that at any instant the increment of steam admitted is the amount of steam required to raise the simultaneously admitted increment of corn mixture to the desired processing temperature. In general, this proportion is about 0.07 to 0.12 pound of steam per pound of corn for each 100° F. rise in temperature desired. Direct steam injection brings about instantaneous heating of the liquid component of the corn product mixture.

Because the solid component consisting primarily of the cap product does not attain the same temperature as rapidly as the cream component, the mixture is passed through a heat exchanger tube to equalize the difference with little or no loss of product temperature prior to deaeration. The heat exchanger consists of a product tube jacketed by a second steam tube. Steam is passed counter-currently to the product flow through the jacket and condensate is removed by means of a condensate trap. At most when preparing vegetables for canning by ordinary methods the product remains in the heat exchanger but a few seconds.

When preparing vegetables for freezing or for canning the product is sterilized by aseptic techniques the product is sterilized by holding it within the heat exchanger for longer periods and usually at somewhat higher temperatures, as is explained in more detail hereinafter. The longer holding period is accomplished simply by the use of a somewhat longer tube. Sterilization is, of course, not necessary for vegetables prepared for freezing. They may simply be precooked by holding of the high temperature for somewhat shorter periods. The procedures and conditions described from this point to the end of Example I are specific to the preparation of cream style corn for canning by ordinary methods.

From the heat exchanger the uniformly heated product is passed through an orifice and nozzle into a deaerating chamber maintained under vacuum. The vacuum used is dependent upon the product temperature desired after deaeration and the temperature of the product entering the deaerator. Product temperature after deaeration is desirably maintained at about 180° to 200° F. at the time of filling. To achieve this temperature the product temperature is dropped in the deaerator to about 190° to 210° F. Sufficient vacuum (about 1 to 15 inches) is used to drop the temperature from the heat exchanger temperature to about this range. For example, 3 to 4 inches of vacuum in the deaerator is effective to drop the product temperature from the preferred 220° to 240° F. heating range to the desired (190° to 210° F.) temperature range.

Vacuum is created either mechanically with a pump, or, as shown in Figure 1, by use of a Venturi tube and steam in connection with a barometric condenser.

In the deaeration process occluded gases and entrained air are removed from the product. This serves to minimize can head space difficulties and minimizes darkening of the product due to oxidation from this source during processing and storage.

From the deaerator the corn product is pumped under vacuum to a consistency controller unit. Here the product is rendered uniform in consistency by the addition of small quantities of hot water, when necessary. Due to differences in corn maturity, cream style corn is manufactured with a somewhat heavier consistency than desired in the finished product and then slightly diluted.

The deaerated product of uniform consistency is filled into cans using any conventional filling equipment. The product should be transferred as rapidly as possible from the consistency controller to the filler bowl taking care that as little air as possible is trapped in the product. By use of the method of this invention the manufacturing steps prior to filling may be reduced to as little as 30 to 60 seconds as compared with up to 35 to 40 minutes by conventional methods. It has been determined, however, that holding periods at elevated temperatures and under agitation to maintain product uniformity of up to ½ hour between manufacture and filling are not detrimental to this product.

Agitated sterilizing processing requires certain minimum fill-in head spaces, depending on the can size used, to insure that the beneficial effects of agitation in the sterilizing process are realized. On the other hand, legal head space requirements must be met. Two factors operate to increase cut-out head space, which is measured at room temperature, over the fill-in head space. The first is that cream style corn is filled hot (about 180° to 190° F.) and the contraction of water going from this temperature to about 70° F. alone accounts for a major portion of the increase in cut-out head space. The other is that the corn itself undergoes contraction on cooling. This is demonstrated by the fact that the head-space increase of cream style corn on cutting out is always greater than the theoretical increase in head space due to contraction of an equal weight of water in the same size can.

It is believed that occluded gases and entrained air in the corn, and perhaps dissolved gases in the water used in manufacturing, play a part in unexplained head space increase on cutting out. Since the variables of gases in the corn, entrained air in the mixture of ingredients and dissolved gases in the water are not controllable, deaeration of the product is necessary to minimize their detrimental effect on head space.

After filling, the cans are hermetically sealed and are ready for sterilizing processing.

With proper fill-in head space for the can size used, the canned deaerated product of uniform consistency is sterilized in an agitated process. Sterilizing process of the order of about 13 to 20 minutes at about 250° to 280° F. are used to give a sterile product. This is a considerable reduction in time over a normal still sterilizing process requiring about 65 minutes at 250° F. for a 303 x 406 can size with a 180° F. initial temperature. At the same time the agitated process results in a natural corn color and flavor, avoiding the darker color and overcooked flavor due to caramelization and avoiding coagulation of the cream constituent.

The limitations on the temperature and time ranges for sterilization are those imposed by the best available commercial equipment. Higher temperatures and shorter sterilization times have been successfully employed in the laboratory on small runs. Temperatures as high as 300 to 325° F. for periods of from 5 to 10 minutes appear to be feasible for commercial production when equipment capable of these processing conditions is available.

The product manufactured according to this invention has been successfully carried out in two types of agitating cooking equipment. One is that in which the cans are continuously advanced through the cooker along a helical track around the periphery of a cylindrical pressure vessel. At the bottom of the track the cans spin rapidly, agitating the contents of the cans and speeding the rate of heat penetration into the contents and materially reducing the time required for sterility. The other type is that in which the cans are spun on their cylindrical axes, that is, end over end.

After sterilization, the canned corn product is cooled with water while the can is agitated in a similar manner to that by which it was sterilized.

In carrying out the method of this invention there are wide ranges of variables both as to equipment and conditions. The following examples are cited as illustrative only and are not to be construed as limitation on the invention.

The steam injector chamber comprises a tube 1 inch in diameter and 12 inches long reduced to one-half inch at the inlet end and three-eighths inch at the discharge. Steam pressures to the injector of from fifty p.s.i. to ninety p.s.i. have been used. The initial pressure drops rapidly within the injector so that pressures at the discharge of the injector have been in the range of six to twenty-four p.s.i. The temperature of the product as it is discharged from the injector has varied between 213° and 246° F.

The heat exchanger comprises a one inch tube 80 inches long packeted in a 3 inch tube over 72 inches of its length. Steam pressures used and temperatures attained are substantially the same as for the injector.

The deaerator is a chamber 18 inches in diameter and 46 inches high. The temperatures of the product entering the deaerator have ranged from 207° to 235° F. Steam at from 80 to 100 p.s.i. has been introduced to the Venturi to produce up to 14 inches of vacuum. The resulting vacuum accounts for discharge temperatures from the deaerator of from 178° to 211° F. The product then cools in its passage through the consistency controller and in the filler supply tank to the desired filling temperatures.

Filling, closing and sterilization take place in standard equipment available for that purpose. With that equipment sterilization is accomplished in from about 13 to 20 minutes and temperatures ranging from about 250° to 280° F.

Although the use of agitating sterilizing process have been proposed for preparing cream style corn heretofore, such processes have not been practicable because frequent or unpredictable sporadic coagulation of the cream component takes place, producing an unsightly and unpalatable product. Even where the use of special thick boiling starch has been proposed to reduce or prevent coagulation of cream style corn in an agitated process, the viscosity of the cream component has been increased to such an extent as to reduce the rate of heat penetration into the can contents and necessitating substantially longer heating times. As a result, flavor, color and appearance are adversely affected.

In carrying out the process of this invention freedom from coagulation of the cream component of the finished product is not dependent upon the use of any particular starch. Rather than requiring the high viscosity of unmodified starches or specially prepared thick boiling starches to prevent curdling this invention may be carried out using a thin boiling starch and yet the finished product will be coagulation resistant.

The lower viscosities resulting from the use of thin boiling starches make possible a more rapid heat penetration with a reduction is processing time. Because of the less severe treatment of the product due to rapid initial heating in manufacture there is less breakdown of both natural and added starch viscosity. As a result it is possible to use smaller quantities of thin boiling starches than of the starches found necessary in conventional methods. Starch may be used in amounts ranging from less than about 0.25 to 2.5 percent based on starting materials. In general less starch is required for more mature corn. With some varieties of corn the use of starch may be eliminated completely. The starch is preferably added to the salt-sugar solution in the form of an aqueous slurry in order to reduce mixing time. It may, however, also be added dry, sifting the starch into the solution with agitation, or, in some instances, a pregelatinized starch paste may be prepared prior to ingredient mixing by heating an agitated suspension of dry starch in water. Other thickening agents, such as alginates, may be used in lieu of starch.

The invention is illustrated, but not limited, by means of the following examples:

*Example I*

Three hundred and twenty-one pounds of 72% moisture fresh, single-cross golden sweet corn were husked, trimmed and cut. The cutter was adjusted to cut kernel tops with an average depth of 9/32 inch. The interior portion of the kernels remaining was scraped from the ear. The mixture of kernel tops and scrapings was cleaned of silks, attached husks and small pieces of cob. Thirty-six pounds of tap water were placed in a mixing tank. Six and one-half pounds of sugar and nine-tenths pound of salt were added dry to the mixing tank and dissolved in the water with agitation. One pound of thin boiling starch (Corn Products Refining Company's Buffalo 4X brand) was added dry to the salt sugar solution and suspended by agitation. Ninety pounds of the prepared corn mixture were added to the mixing tank and blended with the other ingredients by agitation at room temperature.

This mixture was then pumped into a combination of two steam injectors in parallel arrangement at a rate of 42 pounds per minute. The injector steam supply pressure was 63 p.s.i. The pressure of the heated product leaving the steam injector was 20 p.s.i. and the temperature of the product was 241° F. The heated product was passed through a steam jacketed heat exchanger. The temperature of the product leaving the heat exchanger was 242° F. The product was next passed into a vacuum deaerator. Steam pressure to the vacuum system of the deaerator was operated at 86 p.s.i. resulting in a vacuum of about 3 inches. Due to the vacuum, there was a controlled temperature drop of 26° F. from a product entering temperature of 235° F. to a product outlet temperature of 209° F. The product was pumped from the deaerator while still under a condition of vacuum to a filler supply tank. The product was sampled at this point and found to have a Stormer Viscosimeter hot paste viscosity of 8.9 seconds. The washed and drained residue was found to be 36.2%. The yield of product was 146.5 pounds including 12.1 pounds of water condensed in the system.

The product was filled into 303 cans using a ¼ inch can fill-in head space at a temperature of just under 199° F. The cans were hermetically sealed and were processed for 15 minutes at 270° F. in an agitating cooker. Thereafter the cans were cooled to room temperature by agitating in water.

*Example II*

A similar run was made using corn prepared as described in Example 1, except that the cutter was set to cut the kernel tips with an average depth of 7/32 inch. Thirty-two pounds of tap water were placed in the mixer. Six and one-half pounds of sugar and 0.9 pound of salt were dissolved in the water and 1¼ pound of starch was suspended in the solution. Ninety pounds of corn were blended into the suspension, all at room temperature. This product mixture was pumped to the steam injector at the rate of 36.9 pounds per minute. The steam pressure into the injector was 72 p.s.i. The pressure on the product leaving the injector was 22 p.s.i. and its temperature was 240° F. The temperature of the product as it was introduced to the deaerator was 235° F. A steam pressure of 80 p.s.i. to the vacuum system of the deaerator resulted in a vacuum of about 3 inches. As a result the outlet temperature of the product was reduced to 205° F. The deaerated product was pumped to a consistency controller where a small amount of hot water was added to bring the product to the desired consistency, after which it was filled at a temperature of about 165° F., the cans were sealed and the product was sterilized. The yield of product was 140.8 pounds including 9.05 pounds of steam condensed in the process and water added for consistency control.

It has previously been suggested to sterilize heat sensitive fluids such as fruit juices by means of direct steam injection under pressure. U.S. Patents No. 2,625,488, issued on January 13, 1953, and 2,636,430, issued on April 28, 1953, to the Secretary of Agriculture describe such a process and apparatus. It has not, however, been suggested that steam injection under pressure was adapted to the treatment of solids, such as vegetables, or, in the case of cream style vegetables, that the product would be coagulation resistant when sterilized in an agitated process.

The quick heating method of this invention is especially adapted for the preparation of vegetables to be sterilized in bulk and filled into containers under aseptic conditions. In this instance, the vegetable product from the deaerator is passed to a continuous flow tubular heat exchanger or similar vessel wherein it can be maintained at sterilizing temperatures for a time sufficient to adequately sterilize the product. Thereafter the product is filled into containers under aseptic conditions, closed and cooled.

The aseptic canning method is illustrated by the following general examples:

*Example III*

A cream style mix is prepared as previously described and blended with an aqueous solution of sugar and salt with or without starch. This blend is heated using one or more steam injectors to substantially instantaneously raise the temperature to about 285° F. to 300° F. The heated product is then immediately passed to a steam jacketed tubular holding section and held for about 30 seconds to 120 seconds to achieve sterility. During this time the temperature of the liquid and solid components of the product blend are equalized at the desired level. While somewhat lower temperatures than 285° F. may be used it is impracticable since longer times are then required for sterilization. The longer holding times are achieved by using a longer jacketed heat exchanger tube.

The sterilized product is passed into a deaerator operated under vacuum conditions to flash the product to 200° F. This product is continuously maintained under aseptic conditions and passed to a filler holding tank and thence to an aseptic filling and can sealing system. The sealed cans are cooled to 95° to 105° F. by conventional means.

*Example IV*

A cream style corn mix is prepared, blended, initially heated by steam injection and sterilized as in Example III. The sterilized product is passed into a deaerator operated under vacuum conditions to flash the product to 100° F. This relatively cool product is passed to a filler holding tank, filled and sealed, all under aseptic conditions. Rapid cooling of the container after filling is not required according to this procedure.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. A method of preparing coagulation resistant cream style vegetables which comprises preparing a cream style vegetable mix of solid components and cream components, blending this mix at room temperature with a thickening agent in an aqueous sugar-salt solution, to produce a heterogeneous two-phase solid-liquid mixture instantaneously heating the blended mixture by direct steam injection under superatmospheric pressure, equalizing the temperature of solid and liquid components of the heterogeneous two-phase product mixture, deaerating the product by discharging to a zone of lower pressure, filling the deaerated product into containers and hermetically sealing, sterilizing the canned vegetable product under agitation and cooling to room temperature.

2. The method according to claim 1 further characterized in that the blended heterogeneous mixture of solid and liquid components is instantaneuolsy heated to a temperature of about 185° F. to 250° F. by direct injection of steam at from about 50 to 90 p.s.i.

3. A method of preparing coagulation resistant cream style corn which comprises preparing a cream style corn mix of solid cap components and cream components, blending this mix at room temperature with an aqueous sugar-salt solution, to produce a heterogeneous two-phase solid-liquid mixture instantaneously heating the blended mixture to an elevated temperature in the range of about 185° F. to 250° F. by direct steam injection under superatmospheric pressure, deaerating the heterogeneous mixture and cooling to about 190° F. to 210° F. by discharging the mixture to a zone of lower pressure, filling the deaerated and cooled product into containers and hermetically sealing, sterilizing the canned corn product under agitation by a high temperature short-duration sterilizing process and cooling to room temperature.

4. The method according to claim 3 further characterized in that the temperatures of the solid and liquid components of the heterogeneous cream style corn mix and aqueous solution are equalized in the initial elevated temperature range by passing the product mixture in countercurrent flow with a hot medium.

5. The method according to claim 3 further characterized in that a slurry of a thin boiling starch is blended with the heterogeneous cream style corn mix and aqueous solution.

6. The method according to claim 3 further characterized in that the blended heterogeneous mixture of cream style corn mix, flavoring solution and starch are instantaneously heated to a temperature of about 220° F. to 245° F. by direct injection of steam at about 50 to 90 p.s.i.

7. The method according to claim 3 further characterized in that the deaerating and cooling zone is maintained under from about 1 to 15 inches of vacuum.

8. The method according to claim 3 further characterized in that sterilization is accomplished in from about 13 to 20 minutes at a temperature from about 250° to 280° F.

9. In the method of preparing cream style corn which comprises preparing a cream style corn mix of solid cap components and cream components, blending this mix with a slurry of starch in a sugar-salt solution, filling into containers and hermetically sealing, sterilizing under agitation and then cooling, the improvement which resides in the steps of blending the cream style mix with the starch and flavoring solution at room temperature to form a heterogeneous two-phase solid-liquid mixture, instantaneously heating the blended heterogeneous product mixture to an elevated temperature in the range of about 185° to 250° F. by direct injection of steam under superatmospheric pressure, equalizing the temperatures of the solid and liquid components, deaerating the heterogeneous product mixture by discharging into a zone of reduced pressure and sterilizing for about 13 to 20 minutes at 250° F. to 280° F.

10. The method of claim 9 further characterized in that the blended heterogeneous mixture of cream style corn mix, flavoring solution and starch are instantaneously heated to a temperature of about 220° F. to 245° F. by direct injection of steam at about 50 to 90 p.s.i.

References Cited in the file of this patent

UNITED STATES PATENTS

| | | |
|---|---|---|
| 149,503 | Soule | Apr. 7, 1874 |
| 1,938,522 | Grayson | Dec. 5, 1933 |
| 2,086,338 | Sodergreen | July 6, 1937 |
| 2,502,196 | Ball | Mar. 28, 1950 |
| 2,502,197 | Ball | Mar. 29, 1950 |
| 2,540,028 | Fitzpatrick | Jan. 30, 1951 |
| 2,540,745 | Link | Feb. 6, 1951 |
| 2,592,988 | Whitmore | Apr. 15, 1952 |
| 2,692,200 | Olson | Oct. 19, 1954 |
| 2,767,101 | Ball | Oct. 16, 1956 |
| 2,789,058 | Ball et al. | Apr. 6, 1957 |